United States Patent
Krehbiel et al.

(10) Patent No.: US 9,334,898 B2
(45) Date of Patent: May 10, 2016

(54) LAMINATION SLEEVE WITH AN AXIAL HYDRAULIC FITTING PORT

(75) Inventors: William Courtney Krehbiel, San Marcos, CA (US); Jess Lee Freeman, Poway, CA (US); Steven Gene Muse, Poway, CA (US)

(73) Assignee: Solar Turbines Incorporated, San Diego, CA (US)

( * ) Notice: Subject to any disclaimer, the term of this patent is extended or adjusted under 35 U.S.C. 154(b) by 77 days.

(21) Appl. No.: 13/550,351

(22) Filed: Jul. 16, 2012

(65) Prior Publication Data

US 2014/0015361 A1    Jan. 16, 2014

(51) Int. Cl.
*H02K 7/09*     (2006.01)
*B23P 15/00*    (2006.01)
*F16C 32/04*    (2006.01)
*H02K 15/02*    (2006.01)
*H02K 3/24*     (2006.01)
*H02K 55/04*    (2006.01)
*H02K 5/20*     (2006.01)

(52) U.S. Cl.
CPC .............. *F16C 32/048* (2013.01); *H02K 7/09* (2013.01); *H02K 15/02* (2013.01); *H02K 3/24* (2013.01); *H02K 5/20* (2013.01); *H02K 55/04* (2013.01); *Y10T 29/49236* (2015.01)

(58) Field of Classification Search
CPC ............. H02K 1/20; H02K 3/24; H02K 5/20; H02K 9/16; H02K 55/04
USPC ......... 310/52, 54, 60 R, 61, 90.5, 254.1, 219, 310/250, 361, 201, 647
See application file for complete search history.

(56) References Cited

U.S. PATENT DOCUMENTS

| | | | | |
|---|---|---|---|---|
| 4,229,056 A | * | 10/1980 | Renk ............................ | 384/380 |
| 5,073,037 A | * | 12/1991 | Fujikawa ............ | F16C 32/0614 |
| | | | | 384/107 |
| 5,545,014 A | * | 8/1996 | Sundberg ............ | F01C 21/0863 |
| | | | | 417/204 |
| 5,548,174 A | * | 8/1996 | Siga et al. ............... | 310/216.121 |
| 7,220,055 B2 | * | 5/2007 | Hertel ................. | F16C 32/0651 |
| | | | | 384/119 |
| 8,072,104 B2 | | 12/2011 | Korista | |
| 8,659,190 B2 | * | 2/2014 | Chamberlin ............. | H02K 1/32 |
| | | | | 310/52 |
| 2002/0079764 A1 | * | 6/2002 | Cook .............................. | 310/89 |
| 2008/0219834 A1 | | 9/2008 | Merfeld et al. | |
| 2010/0002969 A1 | * | 1/2010 | Foster ....................... | B61C 9/38 |
| | | | | 384/181 |
| 2010/0164310 A1 | * | 7/2010 | Dames et al. ................... | 310/54 |

(Continued)

OTHER PUBLICATIONS

Sears et al. "Magnetic Bearing Operating Experience." Proceedings of the Twenty-Third Turbomachinery Symposium. 1994. pp. 235-242.
Tessier. "The Development of an Auxiliary Bearing Landing System for a Flexible AMB-Supported Hydrogen Process Compressor Rotor." Proceedings of Mag '97, Industrial Conference and Exhibition on Magnetic Bearings. Aug. 21-22, 1997. pp. 120-128.
Barbey et al. "SKF Response to Solar AMB Patent Applications." Jul. 29, 2014, 8 pages.

(Continued)

*Primary Examiner* — Hanh Nguyen
*Assistant Examiner* — Rashad Johnson
(74) *Attorney, Agent, or Firm* — Procopio, Cory, Hargreaves & Savitch LLP

(57) ABSTRACT

A centrifugal gas compressor radial magnetic bearing (125) may include windings (126), a lamination sleeve (130), and a lamination (127). The lamination (127) aligned with the windings (126) may provide for efficient operation of the radial magnetic bearing (125). The centrifugal gas compressor shaft (120) may include a tapered region (118) with an adjacent shelf (124) for alignment with the forward surface (131) and taper of the lamination sleeve (130). The lamination sleeve (130) may include one or more axial hydraulic fitting ports (136) for coupling the lamination sleeve (130) and shaft (120) with an interference fit.

12 Claims, 4 Drawing Sheets

(56) References Cited

U.S. PATENT DOCUMENTS

| | | | |
|---|---|---|---|
| 2010/0194220 A1* | 8/2010 | Tatematsu et al. | 310/61 |
| 2014/0112774 A1* | 4/2014 | Freeman | F04D 29/051 415/229 |
| 2014/0369865 A1* | 12/2014 | Marsal | F01D 25/16 417/406 |

OTHER PUBLICATIONS

Schweitzer et al. "Magnetic Bearings: Theory, Design, and Application to Rotating Machinery." 2009. Section 13.5: Design Considerations (pp. 401-404).

* cited by examiner

LAMINATION SLEEVE WITH AN AXIAL HYDRAULIC FITTING PORT

TECHNICAL FIELD

The present disclosure generally pertains to centrifugal gas compressors, and is more particularly directed toward a lamination sleeve of a radial magnetic bearing for a shaft of a centrifugal gas compressor.

BACKGROUND

The use of magnetic bearings in rotary machines such as centrifugal gas compressors is increasing. Magnetic bearings work on the principle of electromagnetic suspension. The use of electromagnetic suspension reduces or eliminates friction losses in centrifugal gas compressors.

Magnetic bearings in rotary machines are generally arranged with multiple windings or electric coils surrounding a shaft formed from a ferromagnetic material. Some magnetic bearings use a ferromagnetic lamination on the shaft when the shaft is not formed from a ferromagnetic material. The windings in a radial magnetic bearing radially surround the shaft and produce a magnetic field that tends to attract the rotor shaft. The attractive forces of the windings may be controlled by varying the current in each winding.

U.S. Pat. No. 8,072,104 to M. Korista discloses a magnetic bearing that includes a laminated bearing journal with a shaft-mounted rotating lamination and a corresponding housing-mounted stationary lamination surrounding the rotating lamination, whereby both laminations extend axially to the shaft within a bearing portion, limited on one side by the end of the shaft.

The present disclosure is directed toward overcoming one or more of the problems discovered by the inventors.

SUMMARY OF THE DISCLOSURE

A lamination sleeve of a radial magnetic bearing for a shaft of a centrifugal gas compressor includes a predominately solid body with an axially elongated tubular shape. The lamination sleeve also includes an outer surface and an inner surface. The outer surface is located on a radial exterior of the tubular shape. The inner surface is located radially inward from the outer surface and is configured to contact the shaft when the lamination sleeve is installed on the shaft. The lamination sleeve also includes a forward surface and an aft surface. The forward surface is located at an axially forward end of the lamination sleeve. The aft surface is located at an axially aft end of the lamination sleeve. A hydraulic fitting port extends from the forward surface into the elongated tubular shape. A slot is located on the inner surface and spans circumferentially about the inner surface. A passageway extends from the hydraulic fitting port to the slot. The passageway is in flow communication with the hydraulic fitting port and the slot. An annular flange extends radially outward from the forward end of the lamination sleeve. The flange has an outer diameter larger than the diameter of the outer surface.

A method for installing a lamination sleeve to a shaft of a centrifugal gas compressor to maintain alignment of a lamination with windings of a radial magnetic bearing. The method includes sliding a lamination sleeve with a tapered inner surface onto a shaft with a tapered region. The lamination sleeve includes a hydraulic fitting port extending axially from a forward surface of the lamination sleeve. The shaft includes a shelf at a forward end of the tapered region on the shaft. The method also includes inserting a fitting tool into the hydraulic fitting port and injecting hydraulic fluid into a slot located on the inner surface of the lamination sleeve. The method further includes aligning the forward surface of the lamination sleeve with the shelf of the shaft.

DETAILED DESCRIPTION

Figure 1:
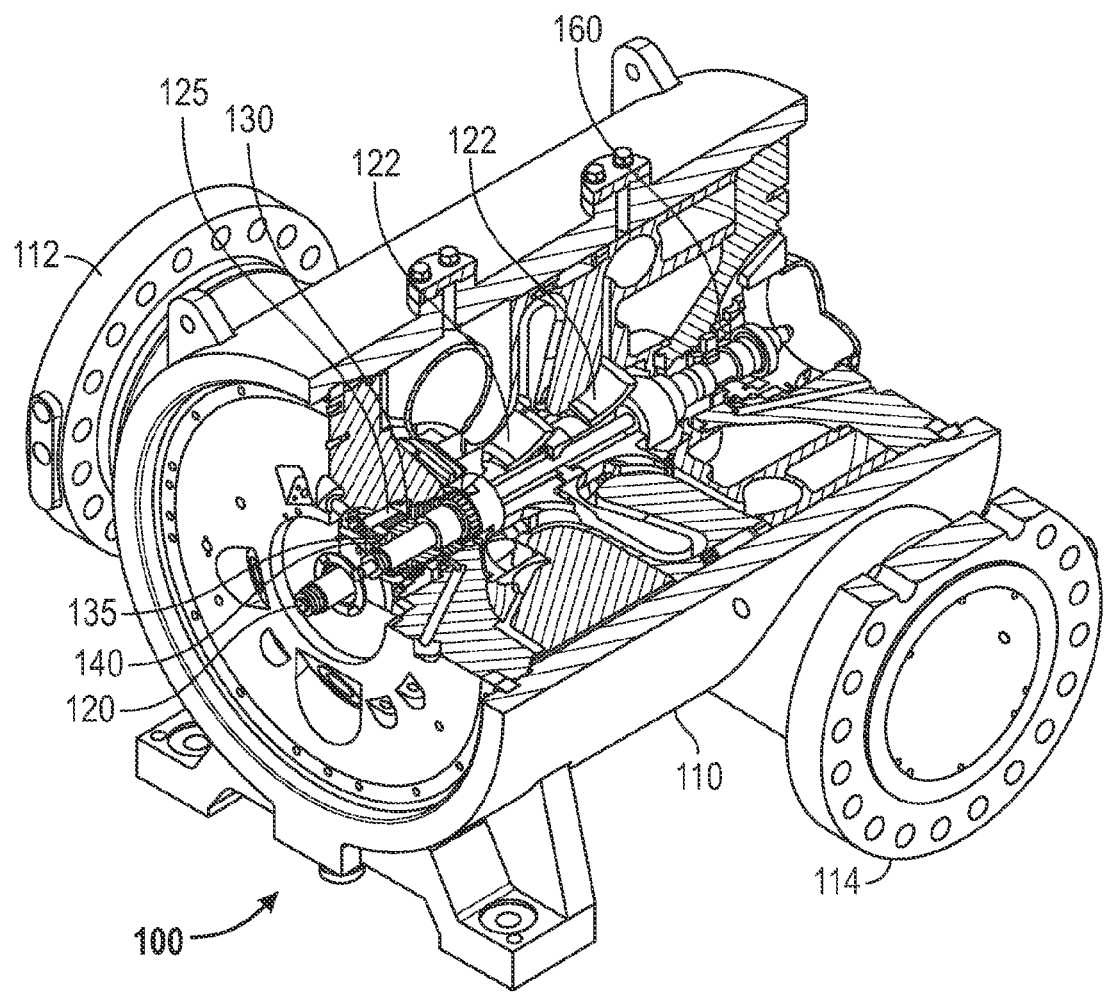
FIG. 1 is a cutaway illustration of an exemplary centrifugal gas compressor.

FIG. 1 is a cutaway illustration of an exemplary centrifugal gas compressor 100. Process gas enters the centrifugal gas compressor 100 at a suction port 112 formed on a housing 110. The process gas is compressed by one or more centrifugal impellers 122 mounted to a shaft 120. The compressed process gas exits the centrifugal gas compressor 100 at a discharge port 114 that is formed on the housing 110. For convention in this disclosure, the suction end of the centrifugal gas compressor 100 is considered the forward end and the discharge end is considered the aft end. All references to radial, axial, and circumferential directions and measures refer to the axis of shaft 120, unless specified otherwise.

Shaft 120 and attached elements may be supported by bearings such as a radial magnetic bearing 125 and an aft radial bearing 160 installed on axial ends of the shaft 120. A radial magnetic bearing lamination sleeve 130 may be installed onto shaft 120 as part of the radial magnetic bearing 125.

Auxiliary bearings 135 may be installed with the radial magnetic bearing 125. Auxiliary bearings 135 may be angular contact bearings. Landing guard 140 may be installed onto shaft 120 with a thermal interference fit and may be installed between shaft 120 and auxiliary bearings 135.

Figure 2:
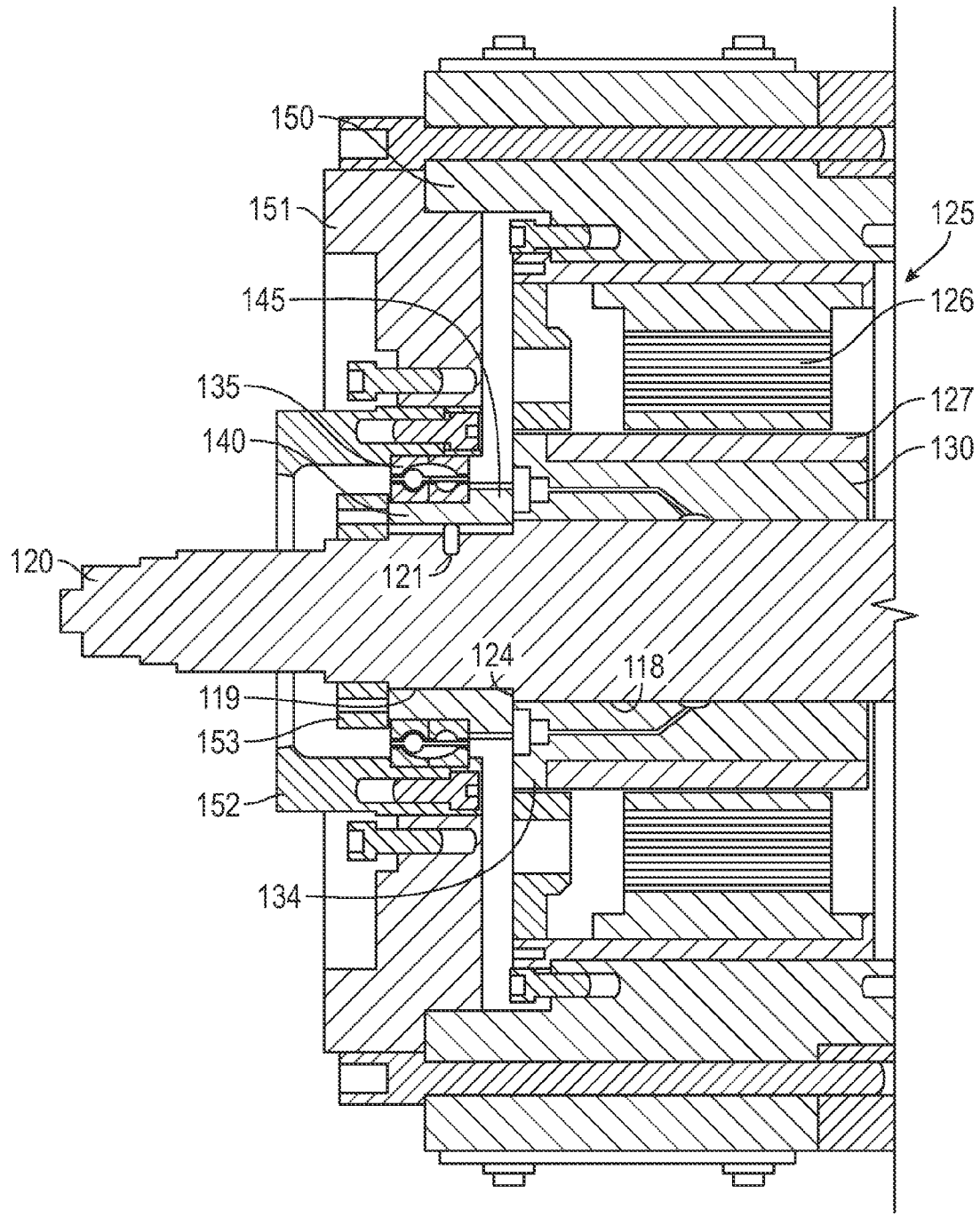
FIG. 2 is a partial cross-sectional view of a suction end of a centrifugal gas compressor including a radial magnetic bearing.

FIG. 2 is a partial cross-sectional view of the suction end of the centrifugal gas compressor 100. In particular, the suction end of the centrifugal gas compressor 100 schematically illustrated in FIG. 1 is shown here in greater detail, including radial magnetic bearing 125. Radial magnetic bearing 125 is located near the forward end of shaft 120 axially aft of auxiliary bearing 135.

Shaft 120 may include a first region generally indicated as 118 and a second region generally indicated as 119. A shelf 124 forms the transition between these two regions, and extends radially outward from region 119 to region 118 in a direction orthogonal to the surfaces of the regions. In one embodiment region 118 is tapered where the outer diameter of the aft end of region 118 is larger than the outer diameter of the forward end of region 118. The outer diameter of region 119 is smaller than the outer diameter of the forward end of region 118. Region 119 is located axially forward of region 118. The varying diameters of shaft 120 may facilitate the installation of radial magnetic bearing 125.

Radial magnetic bearing 125 includes lamination sleeve 130. All references to radial, axial, and circumferential directions and measures for elements of lamination sleeve 130 refer to the axis of lamination sleeve 130, which is concentric to the axis of shaft 120. Lamination sleeve 130 may be installed onto shaft 120 with an interference fit. The inner surface of lamination sleeve 130 contacts region 118 of shaft 120. Lamination sleeve 130 includes flange 134 extending radially outward at the forward end. Generally lamination sleeve 130 will not include ferromagnetic materials.

Lamination 127 is located radially outward from lamination sleeve 130. Lamination 127 is attached or coupled to lamination sleeve 130 at the outer surface of lamination sleeve 130 adjacent to flange 134. The height or thickness of flange 134 may correspond to the height or thickness of lamination sleeve 130. Lamination 127 includes ferromagnetic materials.

Windings 126 are located radially outward from lamination 127 with a radial gap between windings 126 and lamination 127. Windings 126 are aligned axially with lamination 127. Windings 126 may be circumscribed by endcap 150.

Landing guard 140 may be installed onto shaft 120 with an interference fit. The aft end of landing guard 140 abuts shelf 124 and the forward end of lamination sleeve 130. Landing guard 140 may include flange 145 at the aft end which increases the height or thickness of the aft end of landing guard 140.

One or more pins 121 may be installed into shaft 120 within region 119 of shaft 120. Pins 121 may be cylindrically shaped with rounded ends. Pins 121 may interface with landing guard 140 when landing guard 140 is installed to shaft 120.

Auxiliary bearings 135 are located radially outward from landing guard 140 with a radial gap between auxiliary bearings 135 and landing guard 140. The radial gap between auxiliary bearings 135 and landing guard 140 may be smaller than the radial gap between windings 126 and lamination 127. Auxiliary bearings 135 may be adjacent to flange 145 with an axial gap between auxiliary bearings 135 and flange 145.

Endcaps 151, 152, and 153 may be installed at the forward end of the centrifugal gas compressor 100. Endcap 153 is located forward of landing guard 140 and radially outward from shaft 120. Endcap 152 axially overlaps with landing guard 140 and is located radially outward from endcap 153 and landing guard 140. Endcap 151 is located forward of windings 126 and radially outward from endcap 152.

Figure 3:
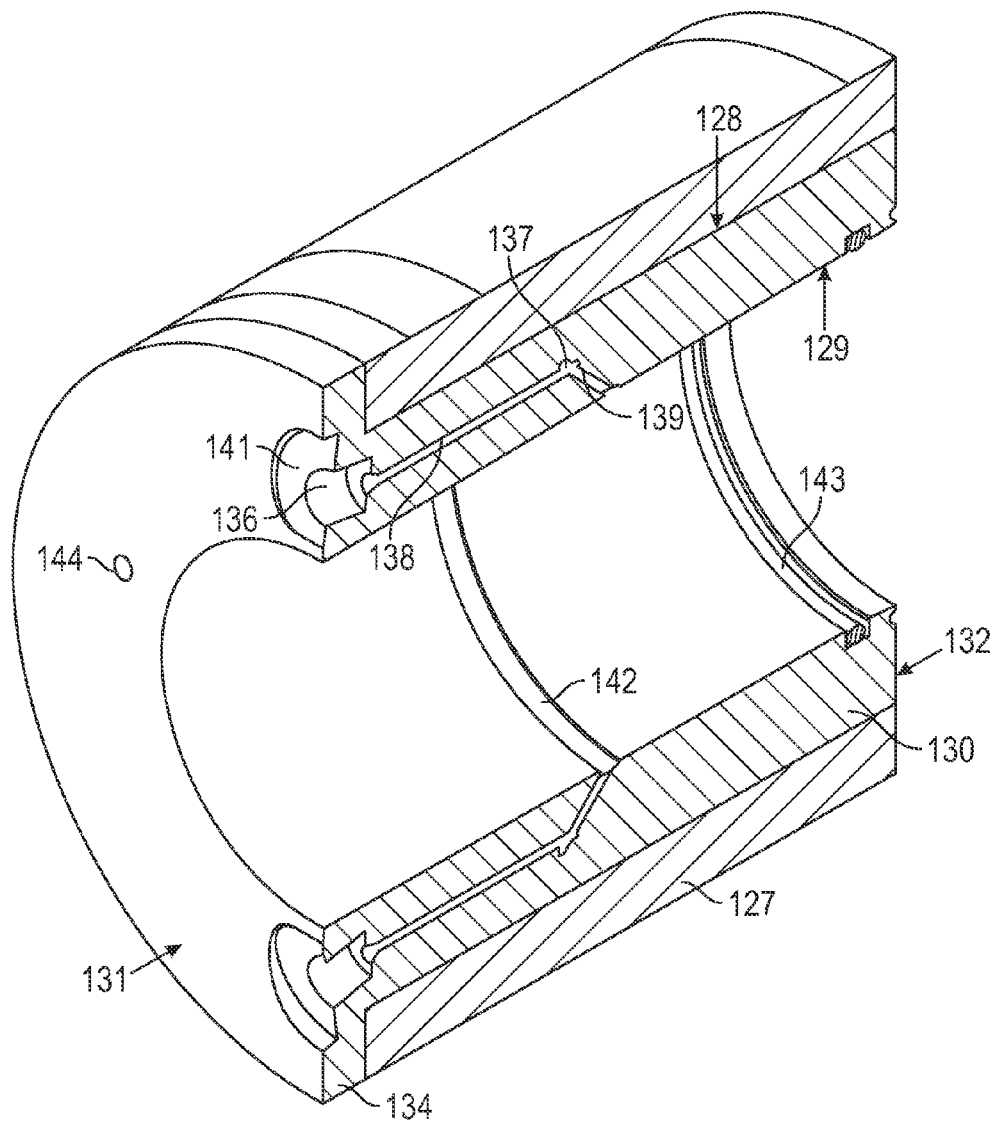
FIG. 3 is an isometric view of a cutaway of an exemplary lamination sleeve and lamination.

FIG. 3 is an isometric view of a cutaway of an exemplary lamination sleeve 130 and lamination 127. Lamination sleeve 130 generally has a tubular shape and is configured to extend axially within the centrifugal gas compressor. The tubular shape being a thickened and elongated circular shape such as a hollow cylinder. Outer surface 128 is the cylindrical surface that generally defines the radially outer boundary of lamination sleeve 130. Inner surface 129 is the cylindrical surface that generally defines the radially inner boundary of lamination sleeve 130. Inner surface 129 is located radially inward from outer surface 128. Outer surface 128 and inner surface 129 generally define the tubular shape of lamination sleeve 130.

Forward surface 131 is located at the forward axial end of lamination sleeve 130. Forward surface 131 extends radially outward from inner surface 129 generally in a direction orthogonal to inner surface 129. In one embodiment forward surface 131 extends radially outward from inner surface 129 to outer surface 128. Aft surface 132 is located at the aft axial end of lamination sleeve 130. Aft surface 132 extends radially outward from inner surface 129 to outer surface 128 generally in a direction orthogonal to outer surface 128 and inner surface 129.

In one embodiment inner surface 129 is tapered. In this embodiment the diameter of inner surface 129 generally decreases from the forward end of lamination sleeve 130 to the aft end of lamination sleeve 130. Thus the diameter of inner surface 129 at its intersection with aft surface 132 is larger than the diameter of inner surface 129 at its intersection with forward surface 131.

Hydraulic fitting port 136 is located at forward surface 131. Hydraulic fitting port 136 extends axially aft from the forward surface 131 into the tubular shape of lamination sleeve 130. Lamination sleeve 130 may include multiple hydraulic fitting ports 136. The embodiment illustrated in FIG. 3 shows a lamination sleeve 130 with two hydraulic fitting ports 136. A counterbore 141 located at forward surface 131 may be included with each hydraulic fitting port 136.

A passageway 137 extends from each hydraulic fitting port 136 to slot 142. Passageway 137 is in flow communication with hydraulic fitting port 136. In the embodiment depicted each passageway 137 includes two sections. The first section 138 generally extends axially aft from a hydraulic fitting port 136. Each hydraulic fitting port 136 and each first section 138 may be angled between zero and fifteen degrees relative to the axial direction of lamination sleeve 130 to accommodate a lamination sleeve 130 installation tool. In one embodiment each hydraulic fitting port 136 and each first section 138 have a five degree angle relative to the axial direction of lamination sleeve 130.

The second section 139 of passageway 137 generally extends radially outward from slot 142. Second section 139 may also be angled to extend radially forward from slot 142. Second section 139 may connect directly to first section 138. First section 138 and second section 139 may be drilled or machined into lamination sleeve 130 to create passageway 137.

In another embodiment passageway 137 is a single section. In this embodiment passageway 137 is machined or drilled along a straight path angled from a hydraulic fitting port 136 to slot 142 and extends both axially aft and radially inward from hydraulic fitting port to slot 142.

Slot 142 is located at inner surface 129. Slot 142 may be a circumferential slot and connects to each passageway 137. Slot 142 is also in flow communication with each passageway 137.

Flange 134 extends radially outward from the forward end of lamination sleeve 130. Flange 134 may be adjacent to hydraulic fitting ports 136. Lamination sleeve 130 may further include seal 143 located at the aft end of inner surface 129 and one or more holes 144 located on forward surface 131. Holes 144 may be circumferentially offset from hydraulic fitting ports 136.

INDUSTRIAL APPLICABILITY

Centrifugal gas compressors are used to move process gas from one location to another. Centrifugal gas compressors are often used in the oil and gas industries to move natural gas in a processing plant or in a pipeline. Centrifugal gas compressors are driven by gas turbine engines, electric motors, or any other power source.

There is a desire to achieve greater efficiencies and reduce emissions in large industrial machines such as centrifugal gas compressors. Installing magnetic bearings in a centrifugal gas compressor may accomplish both desires. Centrifugal gas compressors may achieve greater efficiencies with magnetic bearings by eliminating any contact between the bearings and rotary element. Contact between the bearings and the rotary element generally causes frictional losses to occur. Magnetic bearings may use electromagnetic forces to levitate and support the rotary element without physically contacting the rotary element eliminating the frictional losses.

Using magnetic bearings may reduce or eliminate production of undesirable emissions. These emissions may be produced by leaking or burning a lubricant such as oil. Eliminating the contact and frictional losses between the rotary element and bearings by supporting the rotary element with magnetic bearings may eliminate or reduce the need for lubricants in centrifugal gas compressors. With this elimination or reduction of lubricants or oil, the emissions in centrifugal gas compressors may be reduced or eliminated. Eliminating lubricants may also eliminate the need for the valves, pumps, filters, and coolers associated with lubrication systems.

In centrifugal gas compressor 100 radial magnetic bearing 125 supports shaft 120 radially using magnetic levitation. Radial magnetic bearing 125 uses windings 126. Windings 126 are electromagnets that produce a magnetic field. The magnetic field is generated by the electrical currents traversing windings 126. The attractive force of each winding 126 may be controlled by varying the electric current traversing the winding 126. The magnetic field produced by windings 126 interacts with the ferromagnetic material of lamination 127. The magnetic forces act on shaft 120 through lamination 127 to levitate shaft 120 without any contact between windings 126 and lamination 127.

Auxiliary bearings 135, such as angular contact bearings, are installed in centrifugal gas compressor 100. Auxiliary bearings 135 prevent shaft 120 from contacting radial magnetic bearing 125 or other parts of centrifugal gas compressor 100 when radial magnetic bearing 125 fails or loses power. However, auxiliary bearings 135 may damage shaft 120 if shaft 120 drops from radial magnetic bearing 125 onto auxiliary bearings 135 or if shaft 120 rubs auxiliary bearings 135.

Landing guard 140 is coupled to shaft 120 between shaft 120 and auxiliary bearings 135. Landing guard 140 serves as a sacrificial piece to protect shaft 120 from impact damage, friction damage, or scoring. Any damage will occur to landing guard 140 rather than to shaft 120.

Figure 4:
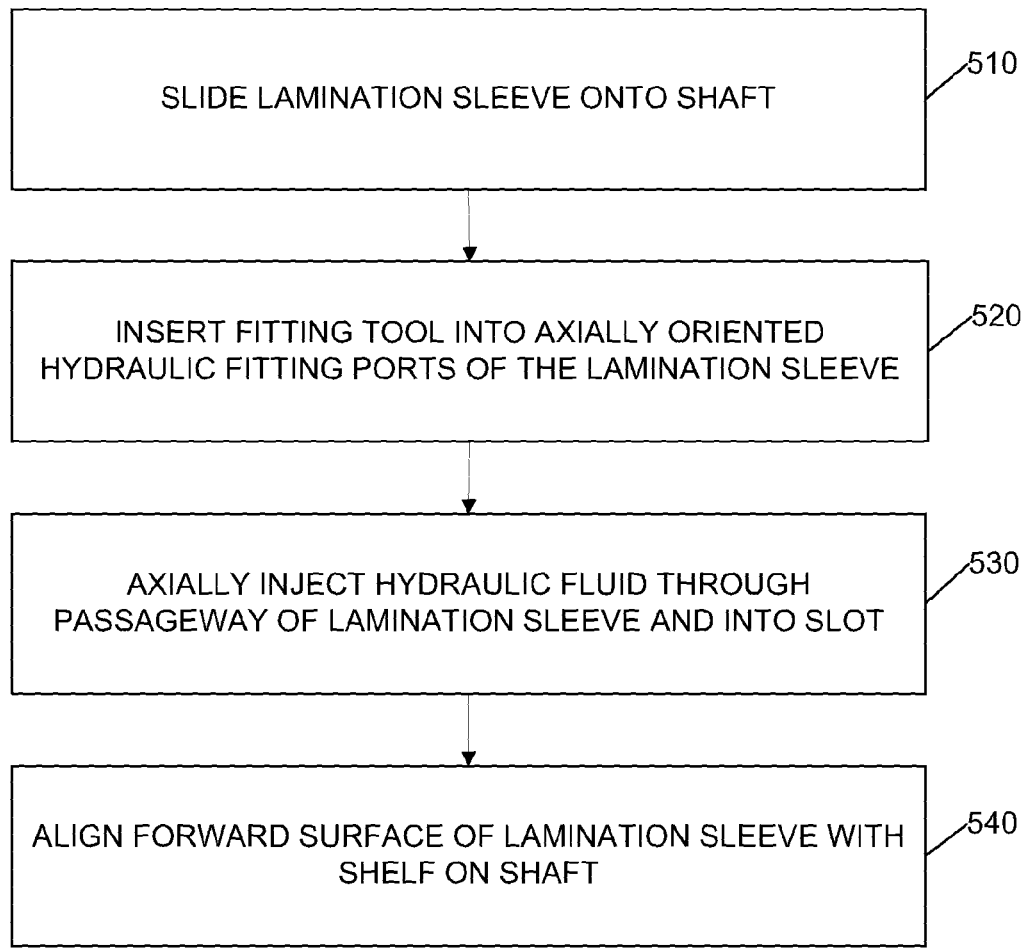
FIG. 4 is a flowchart of a method for installing a lamination sleeve onto a shaft of a centrifugal gas compressor to maintain alignment of a lamination with the windings of a radial magnetic bearing.

Lamination sleeve 130 may be coupled to shaft 120 with an interference fit. FIG. 4 is a flow chart of a method for coupling a lamination sleeve 130 to a shaft 120 of a centrifugal gas compressor 100 with an interference fit to maintain alignment of a lamination 127 with windings 126 of a radial magnetic bearing 125. Maintaining alignment of lamination sleeve 130 within centrifugal gas compressor 100 may help ensure an efficient operation of radial magnetic bearing 125 by maintaining the alignment between lamination 127 and windings 126.

Installation of lamination sleeve 130 begins with sliding lamination sleeve 130 onto shaft 120 at step 510. Region 118 of shaft 120 and inner surface 129 may be tapered. This allows lamination sleeve 130 to slide onto shaft 120 to the point where the taper on inner surface 129 matches the taper on region 118. The taper on lamination sleeve 130 and shaft 120 may prevent lamination sleeve 130 from sliding axially aft along shaft 120 during operation of the centrifugal gas compressor 100. The installer may need to ensure that slot 142 and the surrounding portions of inner surface 129 are in contact with region 118 prior to proceeding to step 520.

It was determined that an axial hydraulic fitting port such as hydraulic fitting port 136 may be used to efficiently couple lamination sleeve 130 to shaft 120 for a centrifugal gas compressor that is axially constructed from the discharge end to the suction end. During assembly the centrifugal gas compressor is oriented vertically with its axis in a vertical position and with the discharge end at the bottom. At step 520 a fitting tool is inserted into axially oriented hydraulic fitting ports 136 located on forward surface 131 of lamination sleeve 130. The fitting tool may include a rigid injection tube that protrudes into the first section 138 of passageway 137 when the fitting tool is inserted into hydraulic fitting port 136. Due to the rigidity of the injection tube hydraulic fitting port and section 138 may need to be axially aligned and may need to be angled similarly relative to the axis of lamination sleeve 130.

Step 520 is followed by axially injecting hydraulic fluid through passageway 137 of lamination sleeve 130 and into slot 142 at step 530. The hydraulic fluid passes from injection tube into passageway 137 and from passageway 137 into slot 142. The hydraulic fluid generates hydraulic pressure enabling the lamination sleeve 130 to be slid along shaft 120.

Generally a hydraulic fit is not designed for precisely aligning components. Shelf 124 is located on shaft 120 to signify the installation position of forward surface 131 for alignment of lamination sleeve 130 within centrifugal gas compressor 100. At step 540 forward surface 131 of lamination sleeve 130 is aligned with shelf 124 on shaft 120. Lamination sleeve 130 and shaft 120 may be configured to maintain their interference fit during the desired operating speeds of centrifugal gas compressor 100 when forward surface 131 is aligned with the shelf 124.

In one embodiment the method for coupling and aligning lamination sleeve 130 with shaft 120 includes coupling landing guard 140 to shaft 120 with an interference fit, abutting shelf 124 and forward surface 131. Landing guard 140 is coupled to shaft 120 with an interference fit to prevent landing guard 140 from slipping in the axial direction. The aft end of landing guard 140 abuts shelf 124 and lamination sleeve 130 to aid in maintaining alignment between shaft 120 and lamination sleeve 130. Landing guard 140 may thus assist in preventing lamination sleeve 130 from sliding axially forward along shaft 120 to maintain proper alignment of lamination 127 with windings 126.

Flange 145 may be located at the aft end of landing guard 140 to provide a larger surface at the aft end of landing guard 140. A larger surface may be needed to maintain alignment of shelf 124 with the forward end of lamination sleeve 130. An increased contact area between landing guard 140 and lamination sleeve 130 may be necessary to prevent misalignment of lamination 127 with windings 126.

The preceding detailed description is merely exemplary in nature and is not intended to limit the invention or the application and uses of the invention. The described embodiments are not limited to use in conjunction with a particular type of gas compressor. Hence, although the present embodiments are, for convenience of explanation, depicted and described as being implemented in a centrifugal gas compressor, it will be appreciated that it can be implemented in various other types of compressors, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A lamination sleeve of a radial magnetic bearing for a shaft of a centrifugal gas compressor, comprising:
   an outer surface;
   an inner surface located radially inward from the outer surface, the inner surface configured to contact the shaft when the lamination sleeve is installed on the shaft;
   a forward surface located at an axially forward end of the lamination sleeve;
   an aft surface located at an axially aft end of the lamination sleeve;

the outer surface, the inner surface, the forward surface, and the aft surface forming an elongated tubular shape;

a slot formed in the inner surface and oriented to extend circumferentially adjacent the shaft at least half of the circumference of the inner surface;

a hydraulic fitting port for receiving a fitting tool that injects hydraulic fluid into the slot during installation of the lamination sleeve to hydraulically fit the lamination sleeve onto the shaft, the hydraulic fitting port extending from the forward surface into the elongated tubular shape;

a passageway extending from the hydraulic fitting port to the slot, wherein the passageway is in flow communication with the hydraulic fitting port and the slot; and a seal located at the inner surface adjacent the aft surface.

2. The lamination sleeve of claim 1, wherein the passageway includes a first section extending axially aft from the hydraulic fitting port and a second section extending radially outward from the slot.

3. The lamination sleeve of claim 2, wherein the hydraulic fitting port and the first section are angled between zero and fifteen degrees relative to an axial direction of the lamination sleeve.

4. The lamination sleeve of claim 3, wherein the hydraulic fitting port and the first section are angled five degrees relative to the axial direction of the lamination sleeve.

5. The lamination sleeve of claim 1, wherein two hydraulic fitting ports extend from the forward surface into the elongated tubular shape.

6. The lamination sleeve of claim 1, wherein a lamination is installed onto the lamination sleeve.

7. The lamination sleeve of claim 1, wherein the hydraulic fitting port includes a counterbore.

8. The lamination sleeve of claim 1, further comprising an annular flange extending radially outward from the forward end of the lamination sleeve having an outer diameter larger than the diameter of the outer surface.

9. The lamination sleeve of claim 1, wherein the inner surface is tapered and an inner diameter of the inner surface at the axially aft end of the lamination sleeve is larger than the inner diameter of the inner surface at the axially forward end of the lamination sleeve.

10. A lamination sleeve of a radial magnetic bearing for a shaft of a centrifugal gas compressor, comprising:

an outer surface;

an inner surface located radially inward from the outer surface, the inner surface configured to contact the shaft when the lamination sleeve is installed on the shaft;

a forward surface located at an axially forward end of the lamination sleeve;

an aft surface located at an axially aft end of the lamination sleeve;

the outer surface, the inner surface, the forward surface, and the aft surface forming an elongated tubular shape;

a first hydraulic fitting port for receiving a fitting tool, the first hydraulic fitting port extending from the forward surface into the elongated tubular shape;

a second hydraulic fitting port for receiving the fitting tool, the second hydraulic fitting port extending from the forward surface into the elongated tubular shape;

a seal located at the inner surface adjacent the aft surface;

a slot for receiving hydraulic fluid during installation of the lamination sleeve onto the shaft, the slot being formed in the inner surface and oriented to extend circumferentially adjacent the shaft;

a first passageway extending from the first hydraulic fitting port to the slot, the first passageway being in flow communication with the slot;

a second passageway extending from the second hydraulic fitting port to the slot, the second passageway being in flow communication with the slot; and wherein the slot extends circumferentially about the inner surface from the first passageway to the second passageway.

11. The lamination sleeve of claim 10, further comprising an annular flange extending radially outward from the forward end of the lamination sleeve having an outer diameter larger than the diameter of the outer surface.

12. The lamination sleeve of claim 10, wherein the inner surface is tapered and an inner diameter of the inner surface at the axially aft end of the lamination sleeve is larger than the inner diameter of the inner surface at the axially forward end of the lamination sleeve.

* * * * *